Dec. 21, 1965   L. ZEMAN ETAL   3,224,563
ENDLESS CONVEYOR FOR MASS MANUFACTURE OF PRODUCTS, FOR
INSTANCE OF SHOES OR THEIR PARTS
Filed Feb. 1, 1963   6 Sheets-Sheet 4

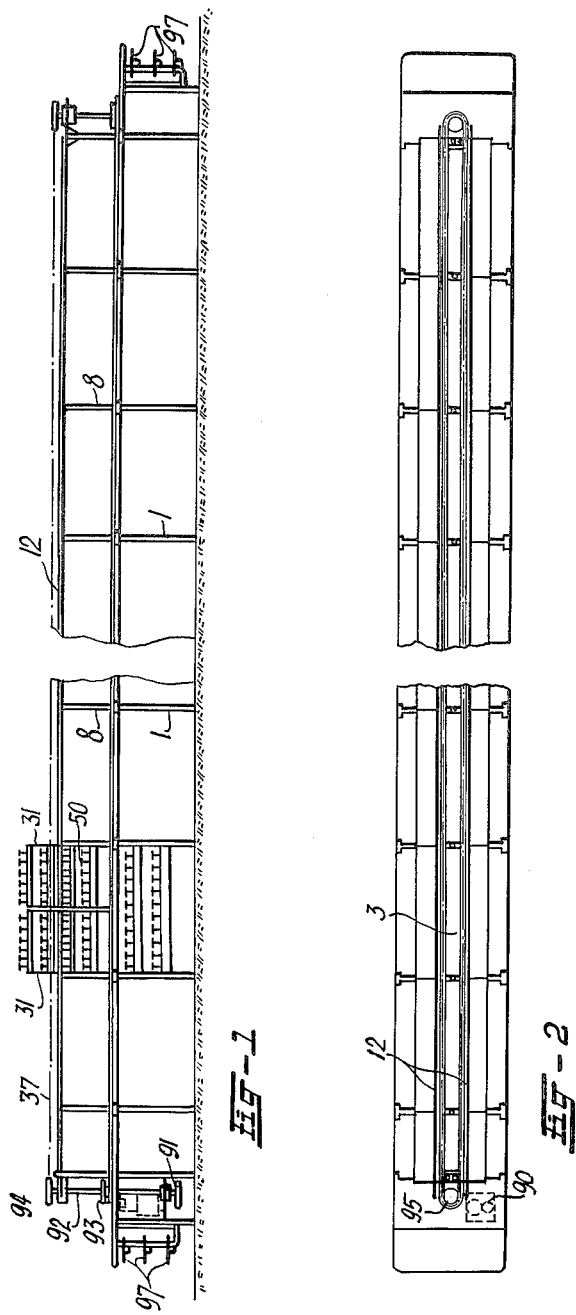

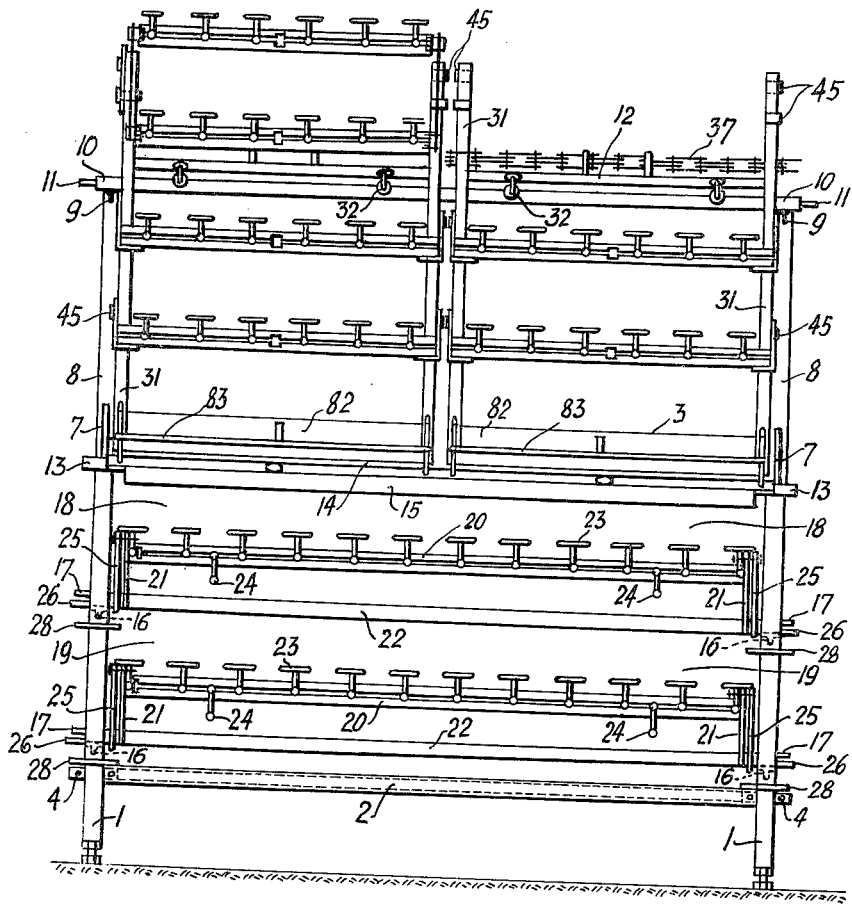

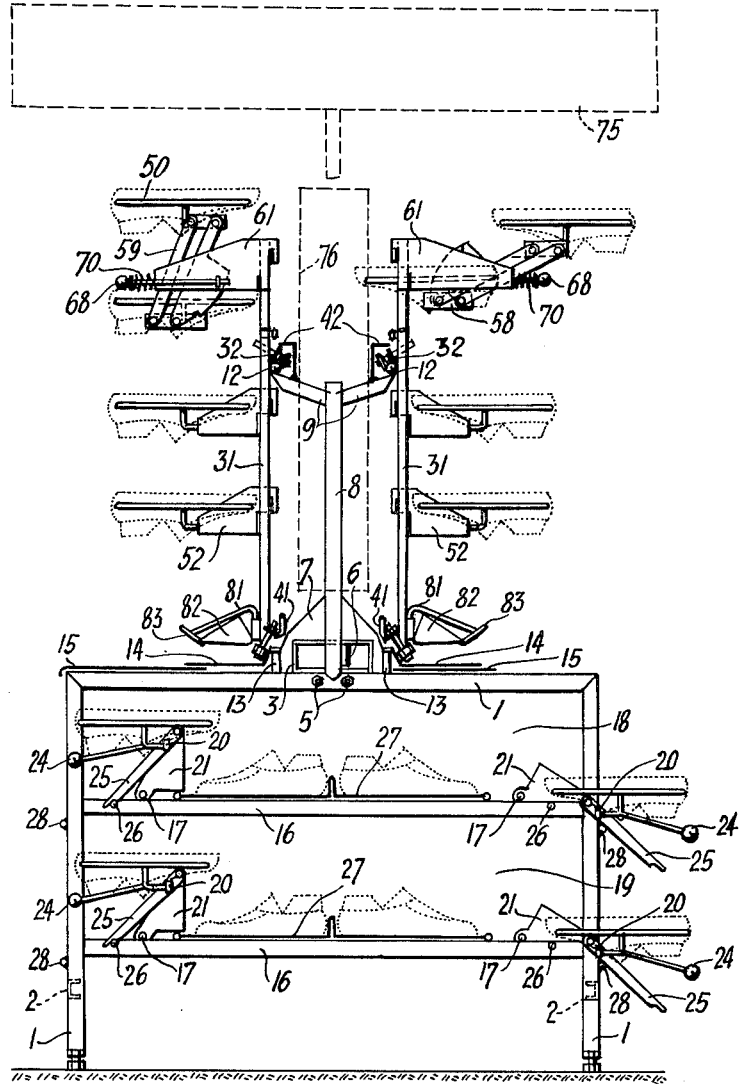

INVENTORS
Lubomír Zeman, František Žák,
Bohumil Kožela, Stanislav Kubíček

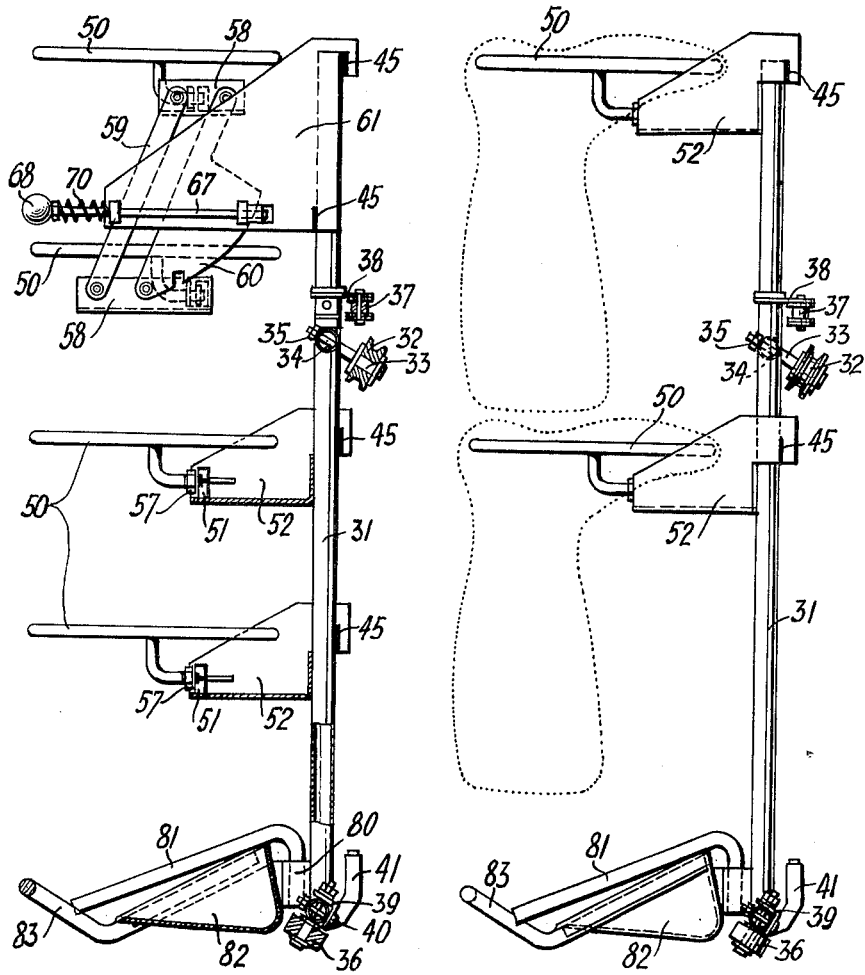

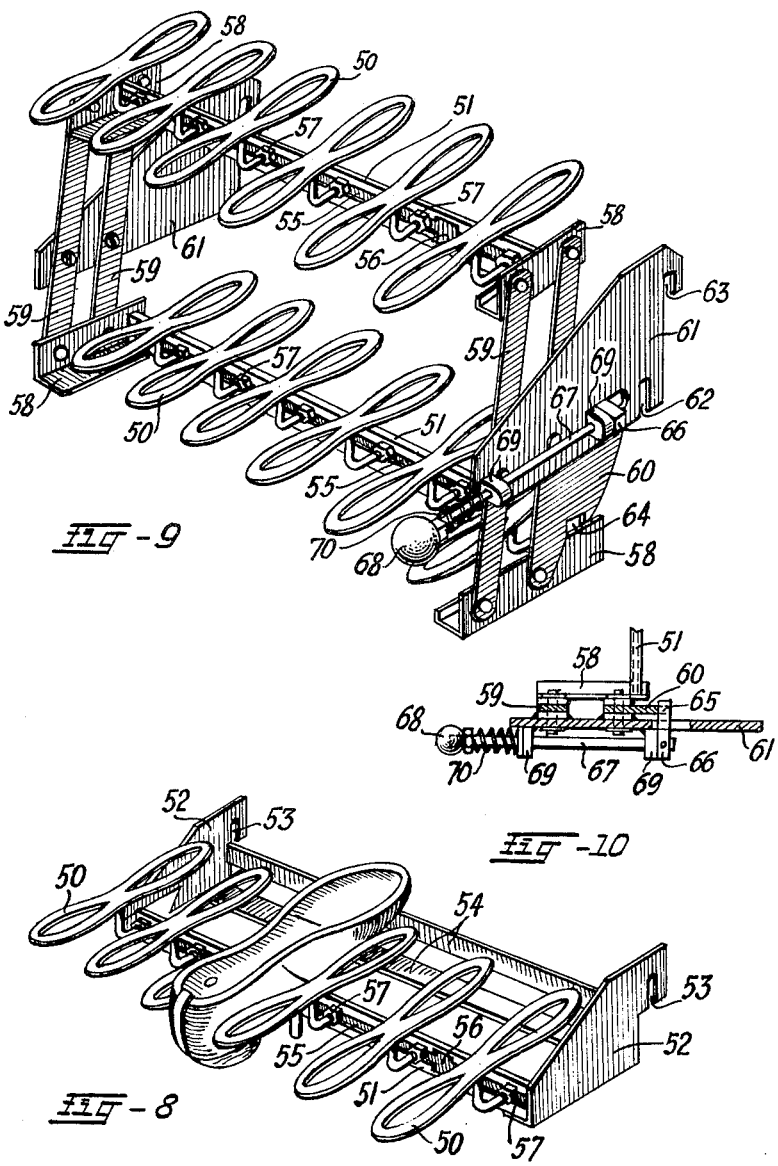

United States Patent Office 3,224,563
Patented Dec. 21, 1965

3,224,563
ENDLESS CONVEYOR FOR MASS MANUFACTURE OF PRODUCTS, FOR INSTANCE OF SHOES OR THEIR PARTS
Lubomír Zeman, František Zák, and Bohumil Koželа, Gottwaldov, and Stanislav Kubíček, Kosiky, Czechoslovakia, assignors to Závody přesného strojírenství Gottwaldov, národní podnik, Gottwaldov, Czechoslovakia
Filed Feb. 1, 1963, Ser. No. 255,522
Claims priority, application Czechoslovakia, Feb. 7, 1962, PV 765/62
7 Claims. (Cl. 198—131)

This invention relates to conveyors for mass manufacturers of shoes or of their parts which are placed on trucks pulled by a common endless chain from one working place to the following one in the course of the sequence of the technological operations along rail tracks arranged in vertical planes. This invention aims particularly at conveyors solving problems of shift-work in mass manufacture and particularly in mass manufacture of shoes.

At present conveyors are commonly used in mass manufacture, conveying semi-products from one working place to the following i.e. from one operation to the following one until at the end of the conveyor the product is finished and leaves the conveyor. Semi-products or parts required for the assembly of the final product are put into or on trucks pulled by a chain. The trucks of presently used conveyors used particularly in the shoe industry have generally a frame and supports for semi-products or parts thereof, provided with traction wheels and pulled by an endless chain along a closed track.

When solving problems with shift work, substantially two designs of conveyors have emerged, which define two conveying methods of products to be worked or to be finished, for instance of shoes. In the first case twin revolving trucks move on the conveyor track pulled by a chain fixed on a common undercarriage with a turntable, on which at a certain place the trucks are turned for 180°, whereby the rear truck comes with respect to the working site in front, i.e. on the outer track, while the previously outer truck comes due to the turning to the inner track. This arrangement gives the possibility that in the course of shoe-manufacture the form stabilisation of the toe and heel parts of the shoes can proceed on the inner track, while on the outer track the further operations can follow undisturbed. This form of arrangement of conveyors for shift-work has the drawback, that revolvable cars, which are for two-shift work arranged in two independent stores, increase the width of the conveyor and thus also the floor space. One shift works on products from the upper branch, the second on products from the lower branch. This arrangement has the drawback, that the workers from one shift work permanently on shoes from trucks on the upper story, while the workers of the second shift work permanently on shoes from trucks on the lower story. As the arrangement of trucks in two stories one above the other has as consequence the raising of the position of the supports of the products on the truck, the compromise solution must necessarily place the lower story unusually low. The shift working on products supported by the lower trucks must bend for each product, taken away or placed upon the truck, while the second shift has the upper support of the products on trucks of the upper conveyor story relatively high, as the position of this upper support overtops the height of the shoulder of a worker of normal size.

Another drawback of the two-story solution is, that it brings about a high percentage of unfinished work as on the inner track both in the higher and in the lower story the trucks are fully occupied by shoes, which are subject to a drying process. These dried shoes proceed along the whole conveyor track, in order to return at the place, where they previously came from the outer track to the inner track, back to the outer track and to follow the further manufacturing process.

The second conveyor design for shift work has on one story two mutually disconnectable trucks, arranged on a turntable pulled by a chain, where the outer trucks are taken along the conveyor track, while the other trucks—the inner trucks—are released from the turntable and placed on the conveyor so that they do not disturb the movement of the products on the outer trucks. The workers of the following shift shift the inner, i.e. the up to now set aside trucks back to the turntable, turn it for 180° and the truck, which has been previously on the outer, i.e. on the working track, are set aside after release from the turntable to the inner parts of the conveyor. Thus trucks with products treated by workers from this shift on the preceding day come to the working branch of the conveyor along which they proceed from working site to working site.

This solution reduces substantially the percentage of unfinished work, there is however still the need of a double number of trucks, of turntables and platforms for setting aside the trucks of the shift which is out of work. This method of solution of this problem of shift work of the conveyor again requires a conveyor wider for two widths of trucks and for two gaps which have to be maintained between the trucks set aside and the trucks on the working branch.

This increases the amount of material required for the manufacture of the conveyor similarly as the previous design of shift conveyors.

In addition to that both above mentioned solutions of conveyors for shift-work have the drawback, that shoes, the soles of which are prior to sewing moistened, cannot be dried on the same conveyor and have to be brought into special drying devices. This requirement follows also from the design of the trucks, which does not allow the use of infrared radiators as in the case of arrangement of shoe supports on the truck, the shoes on the lower supports are shaded by those on the upper supports.

It is an object of this invention to simplify the conveyor design and to simplify equally the manipulation with the products in the case of shift changes, to enable the stabilisation and drying of the products, namely of shoes, directly on the conveyor and to reduce the required floor space.

A substantial feature of this invention is, that spaces with supports adapted for setting aside products are provided within the conveyor case below the tracks for movement of the trucks, which are represented by upper supporting and simultaneously lateral guiding tracks and by lower supporting tracks. The conveyor itself is combined of parts composed by a longitudinal supporting case, divided by partition walls into longitudinal channels for placing of supply conductors of electric current and the tracks for the movement of the trucks are connected by ribs and arms with tubular supports, fixed to the frame and adapted for carrying dismountable infrared radiating panels. A further feature of this invention is, that the conveyor trucks are combined of frames provided with suspension and supporting rollers and with a guiding bolt firmly connected with the frame and cooperating with guiding wheels coaxial with the chain wheels and furthermore one and two story supports for products, suspended on said frame, the two story supports provided with a lever parallelogram, one lever of which is provided with a notch for a safety catch.

The invention, the example of an embodiment of which is shown on the accompanying drawings will now be described and its function and advantages, which it provides, explained. In FIG. 1 there is a side view upon the conveyor with one unit already provided with the respective trucks with supports and with set aside racks within the spaces of the conveyor case.

FIG. 2 shows a top view upon the conveyor without trucks.

FIG. 3 is a detailed view upon one conveyor unit with two trucks and with storage racks.

FIG. 4 is a cross section through the conveyor.

FIG. 6 shows in side view a truck designed for ten pairs of shoes.

FIG. 7 shows—again in side view—a truck adapted for high shoes.

FIG. 8 shows in perspective view a one level support for two and a half pairs of shoes for suspension on the moving frame of the truck.

FIG. 9 is a perspective view upon a support for five pairs of shoes, provided with a parallelogram suspension for bringing the upper support in front of the lower one.

FIG. 10 shows in top view a detail of a catch for locking the position of both supports shown in FIG. 9.

Figure 5:
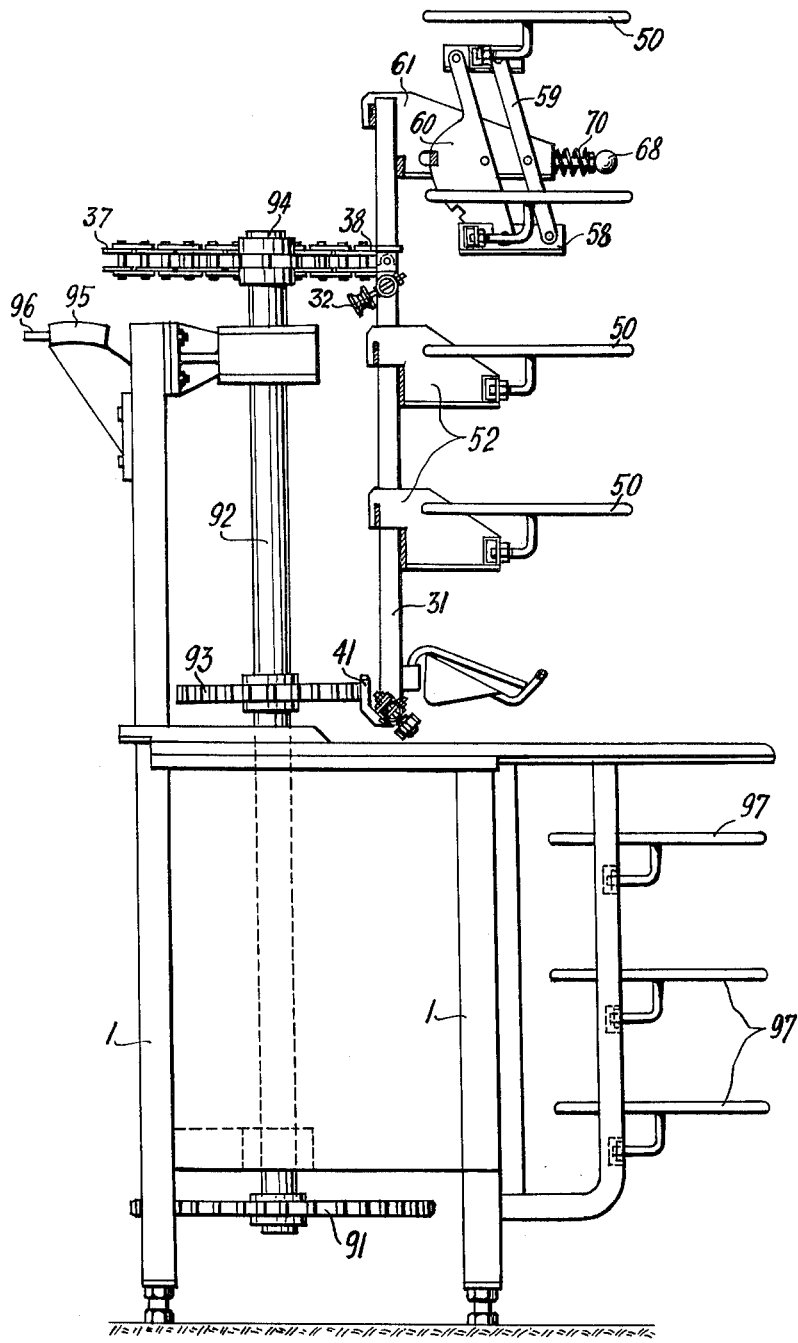
FIG. 5 is a side view upon the driving station with the truck in the course of its turning.

The conveyor (FIGS. 1 and 2) is composed of individual, mutually interconnectable units which are arranged between the driving station on one end of the conveyor and the return station at the other conveyor end. As the individual conveyor units are alike, the specification will deal with one unit only as shown in FIG. 1 together with the respective moving trucks and the storage or set-aside racks and with the driving and return station.

One unit of the conveyor—see FIGS. 3 and 4—is composed of frames 1 made for instance of tubes, which frames are linked in a dismountable way by longitudinal beams 2 and by longitudinal supporting cases 3. The longitudinal beams 2 are fixed to straps 4 provided with threads and connected to the frame 1. The longitudinal supporting case 3 connected by screw bolts 5 to the frame 1 is designed as a sheet trough enclosed at the top by a cover and divided longitudinally by one or more longitudinal partition walls 6 into channels for placing electrical conductors, which feed connecting plugs, not shown on the drawing, serving for the supply of electric current to operating devices, i.e. to machines arranged in the line of technological operations at both conveyor sides and to infrared radiators (together with machines not shown on the drawings) serving for the stabilisation or for drying of products on the conveyor.

A support 8 made of tubes is firmly fixed to the frame 1 by means of ribs 7, said support carrying arms 9 with bolts 10 with ends 11 of reduced diameter upon which ends tubes 12 can be shifted, forming supporting and simultaneously lateral guiding tracks for the moving truck frames. The upper cross beam of the frame 1 is furthermore provided with longitudinal extensions 13, to which supporting tracks 14 are fixed, formed of sheet straps, bent to the shape shown in FIG. 4. These supporting tracks 14 wtih their horizontal face extending outside, cover a part of the horizontal surface of the conveyor unit, the remaining part of which is covered by a sheet 15 which can be inserted from the side.

The front wall of the frame 1 is divided by two cross beams 16 to three parts, which after assembly of the frames 1 to a complete conveyor unit form storage spaces 18, 19 for setting aside shoes under treatment. On the cross beams 16 are again fixed longitudinally orientated bolts 17 wtih reduced diameters on both ends, on which storage racks 20 provided with side walls 21 are pivotally mounted. On the ends of the bolts 17 with reduced diameter distance tubes 22 are shifted. The racks 20 each carry several shoe supports 23 and are provided with operating handles 24. On the left side of FIG. 4 showing the cross section through the conveyor, the racks are shown in the retracted or operative position in which each rack is locked by an arm 25, supported by the bolt 26 and by the contact of the lateral wall 21 with the reinforced rim of stationary storage racks 27, while on the right side of this FIGURE the racks 20 are shown in the projecting or loading position. The arms 25 lock the racks 20 in this position by contact with the longitudinally orientated extensions 28.

The trucks for conveying products by means of the conveyor from operating site to operating site are substantially composed of a frame 31—see FIGS. 3 to 7— provided with wheels, from which the upper wheels 32 have a circumferential guiding groove corresponding to the shape of the supporting and simultaneously laterally guiding track 12. The wheel shafts 33 are fixed in the cross beams 34 of the frame of the trucks in an inclined direction with respect to the plane of said frame and their position is secured by a nut 35. By means of these wheels 32 the frames 31 are suspended upon the tracks 12. The lower supporting wheel 36 is fixed in the lower cross beam of the frame of the truck similarly as the upper wheels. Its circumference is however smooth, as it runs on a plane surface of the supporting track 14. Its axis is again inclined with respect to the plane of the frame, but in the opposite sense than the upper suspension wheels 32. This inclined position of the wheels has its justification as it enables a correct transmission of the weight carried by the truck to the tracks. For this reason the plane defined by the gravity line of the weight carried by the truck passes in the neighbourhood of the crossing line of planes perpendicular to the axis of the suspension and supporting wheels, or from the point of view of statics the reactional forces are crossing at the places of contact of the tracks and the wheels, with the resulting force due to the weight of the truck within this plane. The frame 31 is connected to the moving chain 37 by a connecting eyelet 38. On the lower cross beam of the frame a hook 41 is attached by means of an angle iron 39 and bolts 40. The hook 47 engages in the extreme positions of the conveyor —see FIG. 5—gaps between teeth of guiding wheels 93 at the driving and return station of the conveyor, as will be described later. Ledges 42 connected with the arms 9 of the support 8 prevent a derailment of the trucks. In order to enable the suspension of the trucks by means of the wheels 32, the ledges are at least at one place interrupted. Suspension straps 45 upon which the supports for the products can be suspended, are fixed to the frame 31 of the truck. The distribution of these straps enables the suspension both of single level and of two level supports. The single level supports—see FIG. 8—consist of brackets 50, between which the shoes are deposited of a supporting beam 51 for their support and of side walls 52 provided with notches 53 for the suspension of the support on suspension straps 45 of the moving frame 31 of the truck. The side walls 52 are together linked both by the supporting beam 51 itself and by longitudinal straps 54. The beam 51 supporting the brackets 50 is provided with a slot 55 with an enlarged portion 56 for inserting and adjusting the brackets 50, which are fixed to the supporting beam by nuts 57.

The brackets of two level supports shown in FIG. 9 are arranged similarly. Corresponding parts are in this figure marked with the same numerals. The ends of the two supporting beams 51 of the brackets 50 of this two level support are each fixedly connected with an angle iron 58. The angle irons on one side are linked by means of two arms 59, those on the other side by arms 59 and 60, with which they form hinged parallelograms pivotally connected to the side wall 61. These side walls are again provided with notches 62 and 63 for the suspension of the support on brackets 45 of the moving frames 31. The arm 60 of the parallelogram of this two level support is extended and provided with two relatively distant notches 64 and 65 for defining two positions of the parallelogram by the catch 66—see FIG. 10—connected with a rod 67 with a handle 68 and guided in eyelets 69 fixed to the side wall 61 of the support. The catch 66 on the rod 67 is pressed by the spring 70 into engagement with the notch 65 or 64 in the extended arm 60 of the parallelogram. When the supporting beams 51 are one above the other—see FIG. 9—the catch 66 engages the notch 65. By pressing the rod 67 against the force of the spring 70 and by disengaging the catch 60, it is possible by means of the parallelogram suspension to pull the upper brackets 50 in front of the lower ones and to lock their position by the catch 66 engaging the notch 64. This position of the support is shown in FIG. 4. The movable support arrangement permits the drying of shoe soles directly on the conveyor by means of infrared radiators arranged above the conveyor. In FIG. 4 such a radiator is shown only by the outline of a panel frame 75. The infrared radiating panels—both for drying of soles or for stabilisation of toes or heels of shoes—can be placed on the tubular supports 8 of the frames 1 as dismountable units. An infrared radiating panel for stabilisation of toes or heels of shoes is in FIG. 4 shown at 76. On the lower part of the moving truck frames 31—see FIGS. 6, 7—troughs 82 for products to be finished or to be repaired are suspended in eyelets 80 by bent ends of reinforcements 81. The troughs are additionally provided with a longitudinal supporting arm 83 firmly connected with the reinforcements 81.

The chain 37, with which the moving truck frames 31 are connected, is driven from the output shaft of a gear case 90 (FIG. 2) by a transmission chain, not shown on the drawings, which transmits the torque of the shaft to the chain wheel 91 of the driving station—see FIG. 5—and furthermore to the shaft 92 provided above the conveyor case with two chain wheels, the lower chain wheel 93 and the upper chain wheel 94, over which the moving chain 37 is trained. This driving station represents an independent part of the conveyor similarly as the individual units. It is therefore connected by longitudinal beams to the frame of the adjacent conveyor unit. In the same way—of course without the driving gear case—is arranged the return station. The trucks pulled by the chain 37 are in the extreme positions in fact supported by the upper chain wheel 94, whereas the lower chain wheel 93 guides the moving truck frame 31 by means of the guiding hook 41. After passage of the truck around the shafts of the return and driving station, the wheels 32 of the moving frame strike the extension 95 and reach the upper track, with which it is linked by the bolt 96.

In order to enable to remove the products from the trucks on the return or driving station in case of shift changes and replace them by products which have been prior worked, several tiers of racks 97 are provided below the frame of the station. In a similar way the return station is equipped, for which in FIG. 1 for the racks the same reference numerals have been used.

The described solution presents a number of advantages. The method of shift work, where the exchange of products under manufacture from trucks for similar products from storage spaces in the conveyor case below the tracks of the trucks is accomplished in the course of the first working operation, by the following shift, or in the course of the last operation of the preceding shift, saves a half of the moving trucks, as it removes the hitherto used heavy turnable or set-aside trucks moving along a horizontal track. These trucks are replaced by moving frames, suspended by means of their upper wheels, upon which frames the supports for the products are in a simple manner fixed by hooks, so that there is a possibility of adaptation both of the technology and of the kind of products, whereby the suspension of the trucks enables to use their very light design. This advantage is important in shoe manufacturing, where in accordance with the number and kind of operations on a certain kind or pattern of shoes trucks either for five or ten pairs of shoes are used. As the supports for the products are interchangeable, the truck becomes universal. In the two level support, the normally upper row of brackets 50 can be placed in front of the normally lower row, so that the two rows do not shade each other when they are loaded with shoes whose soles are dried directly on the conveyor by means of overhead infrared radiators. The radiators are provided with holders which can be inserted into openings of vertical tubes 8 of the frame 1 above the trucks in any part of the conveyor.

As due to the design of the trucks as simple moving frames the products conveyed are not shaded by the conveyor, in a direction transverse to the conveyor movement, the infrared radiators 76 (FIG. 4) may be fixed in any suitable part of the conveyor on the vertical tubes 8 of the frame 1, so that the stabilisation of the heels and toes of the shoes proceeds quickly and without the need of a passage of the product along the whole conveyor, as has been the case up to now. The simplification of design of the trucks leads of course also to savings in material for their manufacture. Their tracks one above the other increase their stability, enable to reduce the width of the conveyor, which becomes thus narrower than presently used conveyors for one shift work. This results in addition to a further saving of material also to a saving of floor space.

It is self understood that the conveyor according to this invention is also suitable for one-shift work. Where a two-shift work would not come into consideration, the conveyor case need not be provided with set-aside racks.

We claim:

1. An endless conveyor for manufacturing shoes or their parts comprising, in combination:
    (a) a stationary frame elongated in a horizontal direction;
    (b) a plurality of upright tubular members supported by said frame;
    (c) an endless chain movably supported on said frame;
    (d) driving means and return means respectively arranged at the ends of said frame for actuating movement of said chain;
    (e) supporting and guiding means on an upper part of said frame, said supporting and guiding means constituting two substantially parallel vertically spaced tracks on one side of said tubular members;
    (f) a plurality of trucks connected by said chain, said trucks having respective upper suspension wheels movably engaging the upper track, and respective lower supporting wheels engaging the lower track;
    (g) a plurality of racks releasably mounted on each truck; and
    (h) a plurality of storage racks attached to a lower part of said frame below said tracks.

2. A conveyor as set forth in claim 1, wherein each truck includes a plurality of shafts having respective axes obliquely inclined relative to a horizontal plane, said wheels respectively being mounted on said shafts for rotation about said axes, said wheels transmitting forces to said tracks under the weight of said trucks, the axis of each shaft being substantially perpendicular to the force transmitted by the wheel mounted thereon to the corresponding track.

3. A conveyor as set forth in claim 1, further comprising a guide hook on each truck, said driving means and said return means including respective guide wheels at the ends of said frame, said guide hooks being adapted to engage said guide wheels.

4. A conveyor as set forth in claim 1, further comprising mounting means securing said storage racks to said frame for movement between a retracted position within said frame and a loading position in which said racks are at least partly outside said frame.

5. A conveyor as set forth in claim 1, further comprising a parallelogram suspension on one of said trucks, said plurality of racks on said one truck including two racks mounted on said parallelogram suspension for movement between a first position in which said racks are vertically spaced, and a second position in which said racks are horizontally spaced, and support means on each rack for supporting shoes thereon.

6. A conveyor as set forth in claim 5, further comprising locking means for locking said two racks in said first position and in said second position.

7. A conveyor as set forth in claim 5, further comprising infrared radiator means mounted on said frame for simultaneously providing infrared radiation to shoes supported on said two racks while the same are in one of said positions.

References Cited by the Examiner

UNITED STATES PATENTS

| | | | |
|---|---|---|---|
| 2,850,139 | 9/1958 | Bishop | 198—19 |
| 2,887,209 | 5/1959 | Merchant | 198—19 |
| 2,931,513 | 4/1960 | Cignoli | 211—35 |

SAMUEL F. COLEMAN, *Primary Examiner.*

ERNEST A. FALLER, Jr., WILLIAM B. LA BORDE, *Examiners.*